United States Patent
Belcea

(10) Patent No.: US 8,219,034 B2
(45) Date of Patent: Jul. 10, 2012

(54) METHOD FOR DETECTION OF RADAR SIGNALS

(75) Inventor: John M. Belcea, West Melbourne, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 389 days.

(21) Appl. No.: 12/554,408

(22) Filed: Sep. 4, 2009

(65) Prior Publication Data

US 2010/0060508 A1    Mar. 11, 2010

Related U.S. Application Data

(60) Provisional application No. 61/095,789, filed on Sep. 10, 2008.

(51) Int. Cl.
*H04B 1/00* (2006.01)
*H04B 15/00* (2006.01)

(52) U.S. Cl. .................. 455/63.3; 455/63.1; 455/67.11; 455/67.13; 455/67.14; 455/68; 455/69; 455/296; 342/14; 342/16; 342/20; 342/52; 342/357.63; 342/159

(58) Field of Classification Search .......... 455/423–425, 455/63.1, 63.3, 67.11, 67.13, 67.14, 67.15, 455/68, 69, 161.1, 161.3, 164.1, 166.1, 192.1, 455/214, 226.1–226.3, 296; 342/13, 20, 342/52, 14, 16, 357.51, 357.59, 357.62, 357.63, 342/159
See application file for complete search history.

(56) References Cited

U.S. PATENT DOCUMENTS

| | | | |
|---|---|---|---|
| 6,697,013 B2 * | 2/2004 | McFarland et al. | 342/159 |
| 7,079,812 B2 | 7/2006 | Miller et al. | |
| 7,230,566 B2 | 6/2007 | Theobold et al. | |
| 7,269,151 B2 | 9/2007 | Diener et al. | |
| 7,327,763 B2 | 2/2008 | Ophir et al. | |
| 7,414,572 B2 * | 8/2008 | D'Amico et al. | 342/159 |
| 7,593,692 B2 * | 9/2009 | Hansen et al. | 455/67.11 |
| 7,647,061 B1 * | 1/2010 | Steer et al. | 455/509 |
| 7,702,291 B2 * | 4/2010 | Hansen | 455/73 |
| 7,715,801 B2 * | 5/2010 | Tsuruno | 455/69 |
| 2003/0107512 A1 | 6/2003 | McFarland et al. | |
| 2005/0059363 A1 * | 3/2005 | Hansen | 455/127.4 |
| 2005/0059364 A1 * | 3/2005 | Hansen et al. | 455/127.4 |
| 2006/0258296 A1 * | 11/2006 | Steer et al. | 455/67.13 |
| 2007/0126622 A1 | 6/2007 | Nallapureddy et al. | |

OTHER PUBLICATIONS

47 C.F.R. 15.403, "Definitions," Code of Federal Regulations, Subpart E-Unlicensed National Information Infrastructure Devices, Oct. 1, 1998, pp. 702-703.

(Continued)

*Primary Examiner* — Tuan A Tran
(74) *Attorney, Agent, or Firm* — Randi L. Karpinia

(57) ABSTRACT

A method provides for identifying short radar signals in presence of interfering signals from various sources applicable to U-NII devices. The method includes collecting a set of information about received interfering signals until the End-Of-Burst (EOB) condition is identified. When the EOB is identified, the set information about the received train of interfering signals is processed. The algorithm selects the time interval between two pulses as a possible Pulse Repetition Interval (PRI) and checks if the same time interval or a multiple of it can be found between other pulses in the collected set, with some small acceptable error. Pulses matching the criteria are considered as potential radar pulses. When at least one pulse has been identified as a potential radar pulse for a number of times larger than a predefined limit, it is concluded that that pulse has been generated by a radar installation.

11 Claims, 7 Drawing Sheets

OTHER PUBLICATIONS

Edgard Vangeel, "DFS Update: European Weather Radars-Details and Overview," European Telecommunications Standards Institute (ETSI) BRAN52d01, Aug. 5, 2007, 20 pages.

WI-FI Aliance, "Spectrum Sharing in the 5GHz Band, DFS Best Practices," Spectrum and Regulatory Committee, Spectrum Sharing Task Group, Regulatory Task Group, Oct. 10, 2007, 23 pages.

FCC, "Revision of Parts 2 and 15 of the Commissions' Rules to Permit Unlicensed National Information Infrastructure (U-NII) Devices in the 5 GHz Band," 06-96, Jun. 30, 2006, 52 pages.

"Broadband Radio Access Networks (BRAN); 5 GHz High Performance RLAN; Harmonized EN Covering the Essential Requirements of Article 3.2 of the R&TTE Directive," ETSI EN 301 893 v1.5.1, Dec. 2008, pp. 5.

International Search Report and Written Opinion mailed on Apr. 28, 2010 for International Application No. PCT/US2009/056360.

International Preliminary Report on Patentability mailed on Mar. 24, 2011 for International Application No. PCT/US2009/056360.

* cited by examiner

METHOD FOR DETECTION OF RADAR SIGNALS

RELATED APPLICATIONS

The present application is related to and claims benefit under 35 U.S.C. §119(e) from U.S. Provisional Patent Application Ser. No. 61/095,789, commonly owned with this application by Motorola, Inc., filed Sep. 10, 2008, titled "Method for Detecting In Real time Short Pulses Radar Signals", the entire contents of which being incorporated herein by reference.

FIELD OF THE DISCLOSURE

The present disclosure relates generally to wireless communications and more particularly to wireless communication operation in the presence of radar signals.

BACKGROUND

Unlicensed National Information Infrastructure (U-NII) devices are allowed to operate in 5.15-5.35 Gigahertz (GHz) and 5.725-5.825 GHz bands if they can perform Dynamic Frequency Selection (DFS) for preventing interference with radar operations.

Hardware of U-NII devices considers the identification of high-energy signals on which the receiver cannot identify the proper preamble for achieving the synchronization, as "synchronization errors." Received radar signals do not have the U-NII preamble therefore they are reported by hardware as synchronization errors. But, interfering signals, as adjacent channel interference, interference from other systems operating in the same frequency, incorrectly received preamble due to temporary fading or due to interference from a hidden node, are also reported as synchronization errors. In order to perform a more detailed analysis for identifying the real source of the synchronization error, the U-NII hardware provide additional information as signal strength, signal length and the time of arrival of the interfering signal.

One important DFS requirement is that a U-NII device identifying radar signals in its operating frequency channel should move the operation to a different channel and should not return for at least thirty (30) minutes to the frequency channel where radar signals have been detected. In order to comply with this requirement and continue operating, U-NII devices should not only properly identify radar signals, but should also prevent interpretation of signals from other interfering sources as radar pulses. Practical operation has proven that devices, which cannot discriminate between radar pulses and interfering signals from other sources, would eliminate frequency channels one by one until the whole band is exhausted, as interference free channel does not practically exists.

Some radar detection algorithms are oriented on matching predefined pulses to the set of received signals. This approach has the disadvantage that it can identify only those patterns that have been described in advance. A second disadvantage of such algorithms is the fact that, for matching a large number of radar patterns, a large amount of computation has to be performed.

Accordingly, there is a need for a method and apparatus for accurate real time detection of short pulses radar signals

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
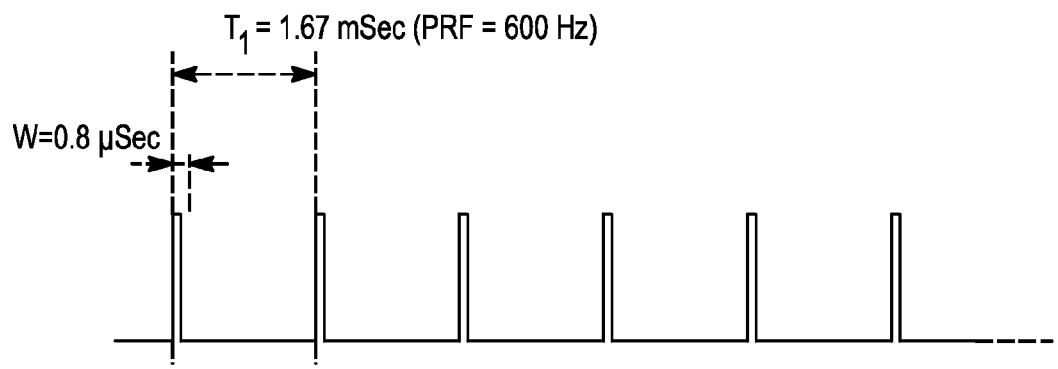
FIGS. 1, 2, 3, and 4 illustrate examples of several signals used by weather radars.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with some embodiments presented herein, a method includes collecting a set of information about received interfering signals until the End-Of-Burst (EOB) condition is identified. When the EOB is identified, the set information about the received train of interfering signals is processed. The algorithm selects the time interval between two pulses as a possible Pulse Repetition Interval (PRI) and checks if the same time interval or a multiple of it can be found between other pulses in the collected set, with some small acceptable error. Pulses matching the criteria are considered as potential radar pulses. When at least one pulse has been identified as a potential radar pulse for a number of times larger than a predefined limit, it is concluded that that pulse has been generated by a radar installation.

The characteristics of radar signals depend on the scope of the measurement. Radar signals are transmitted as pulses. A pulse is a continuous transmission of a sequence of modulated symbols, during which the average symbol envelope power is constant. A radar pulse is characterized by a Pulse Repetition Interval (PRI) that is related to Pulse Repetition Frequency (PRF) and Pulse Duration. Pulse Repetition Interval (PRI) is the elapsed time from the beginning of one pulse to the beginning of the next pulse. Pulse repetition frequency (PRF) is the number of pulses transmitted per second. Pulse Duration is a measurement (typically in microseconds) of pulse transmission time, that is, the time the radar's transmitter is energized during each cycle.

Radar antennae rotate or swap a specific region (angle). Due to this fact, the radar transmission is received as bursts of pulses. The length of a burst depends on the beam-width and the rotation speed of the radar antenna. The number of pulses received during a burst depends on the burst duration and the PRI. Receivers located close to radar installations may receive a continuous train of pulses due to the very high transmit power used for radar transmissions, lateral antenna lobs or environment reflections.

Civilian air navigation and maritime radars are characterized by a power level of ten (10) to fifty (50) kilowatts (kW), with PRF of 800 and 4000 pulses per second (pps) and a rotation speed of about ten (10) rotations per minute (one burst every six (6) seconds).

Weather radars transmit pulses with duration between 0.8 microseconds (μs) and 2 μs with PRF between 250 and 1200 pps. The antenna of weather radar can perform between one (1) and six (6) rotations per minute. The train of pulses can be single-tone, double-tone, triple-tone or staggered.

Figure 2:
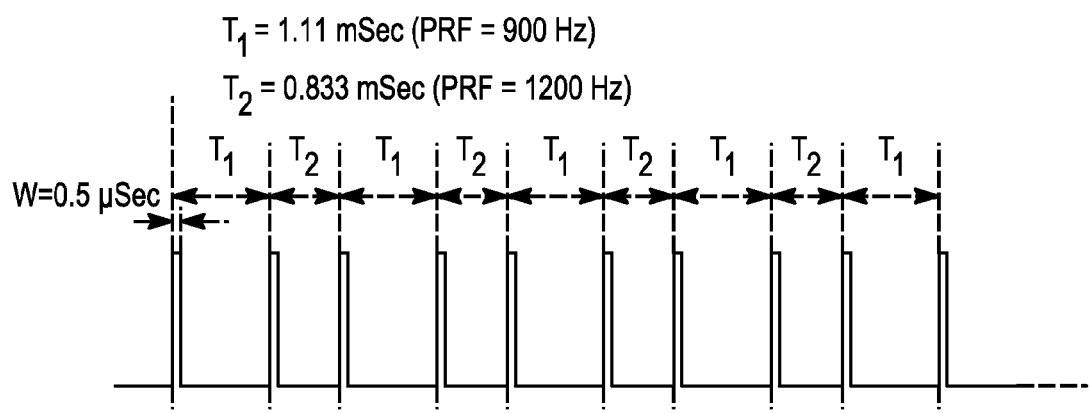
Figure 3:
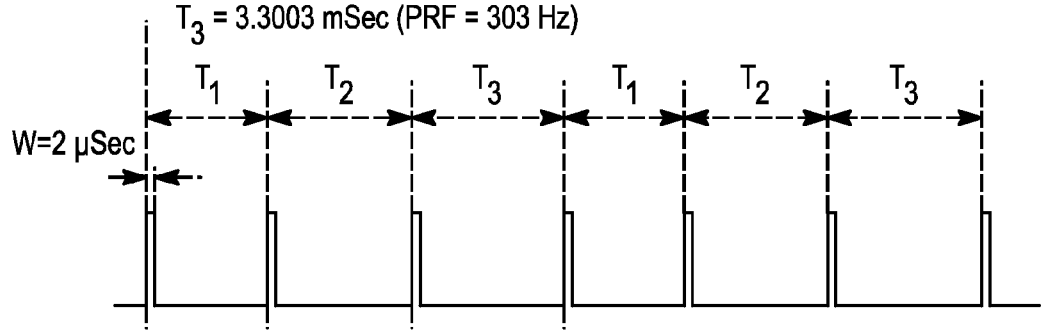
Figure 4:
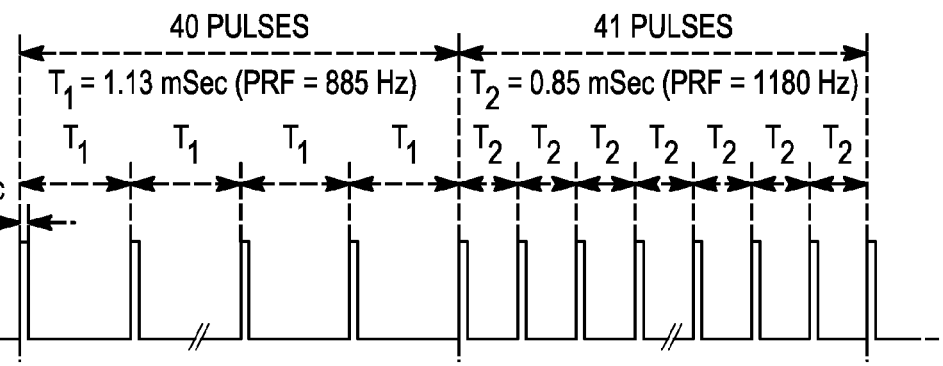

FIGS. 1 through 4 illustrate examples of several signals used by weather radars. FIG. 1 is a single tone pulse used in Austria. FIG. 2 is a double tone pulse used in United Kingdom. FIG. 3 is a triple tone pulse used in France. FIG. 4 is a staggered PRF used in Hungary.

Military radars with fixed locations use similar technique to weather radars. Military radars can also use frequency-hopping technique for avoiding detection and intentional interference. Detecting the existence of military radar signals is very difficult, as those systems have been designed with protection against detection. On the other hand, military radar systems have implemented redundant functionality that allows correct operation in adverse interference conditions much stronger than interference that can be created by U-NII devices.

There are numerous classes of radar signals. Some classes of radar signals use short pulse waveforms (0.5 μs-20 μs). Some classes of radar signals use long pulse radar waveforms (50 μs-100 μs) with pulses of random length transmitted at random time. The present invention provides a method for the identification of radar pulses shorter than 20 μs.

Radar signals are not modulated with the same methods as signals transmitted by U-NII devices. For this reason, U-NII devices receive radar pulses as bursts of energy that cannot be decoded (high bit error rate).

A U-NII device can also receive signals with high bit error rate due to interference from adjacent channels. Adjacent channel interference caused by devices communicating intensively can be incorrectly identified as radar signals.

The fact that signals transmitted by U-NII devices can be interpreted as radar signals causes the networks of U-NII devices to run out of resources due to adjacent channel interference.

For each identified pulse of high-energy, the hardware provides the time when the pulse has been identified, the duration of the pulse and the strength of the received signal.

Some of radar pulses are very short (0.5 μs was recently introduced in Japan). The hardware may not be able to identify correctly the duration of such a short pulse. For this reason, all pulses that have the measured duration equal to zero are considered in this algorithm as of duration 1 μs or less. The reception of a radar pulse is extended over real duration by reflections of the pulse on environment. A radar pulse with a duration of 20 μs that is received together a reflection that has a path longer with 1 kilometer (km), should be seen as a pulse with 23 μs duration.

Regular U-NII signals start with a preamble that is used for synchronizing the receiver to the received signal. The radar signals do not have a recognizable preamble, therefore the time of arrival (or the reception) of a pulse is not so well defined. The hardware may indicate as the time of arrival of the pulse the moment when the automatic gain control (AGC) has passed over some preset value, but such moment if not measured very precisely. Errors of a few microseconds should always be expected regarding the Time of Arrival (TOA) of radar pulses.

As mentioned previously, a requirement exists that a U-NII terminal should change the operating channel if received radar signals are stronger than a predefined limit. Each measurement of signal strength is affected by errors that can have various causes. For being sure that more than 92% of signals received at legal limit are identified as high-energy pulses, the hardware threshold should be set the threshold with $2\sigma$ (two sigma) under the predefined limit, where a is the standard deviation of received signal strength indication (RSSI) values. For many existing types of equipment, the value of a is about 1.5-2 decibels (dB).

When the U-NII device receives a very strong signal that cannot be decoded, the hardware generates an interrupt. The received signal can be either a radar signal, an interfering signal from adjacent channel or a signal from any another source.

Figure 5:
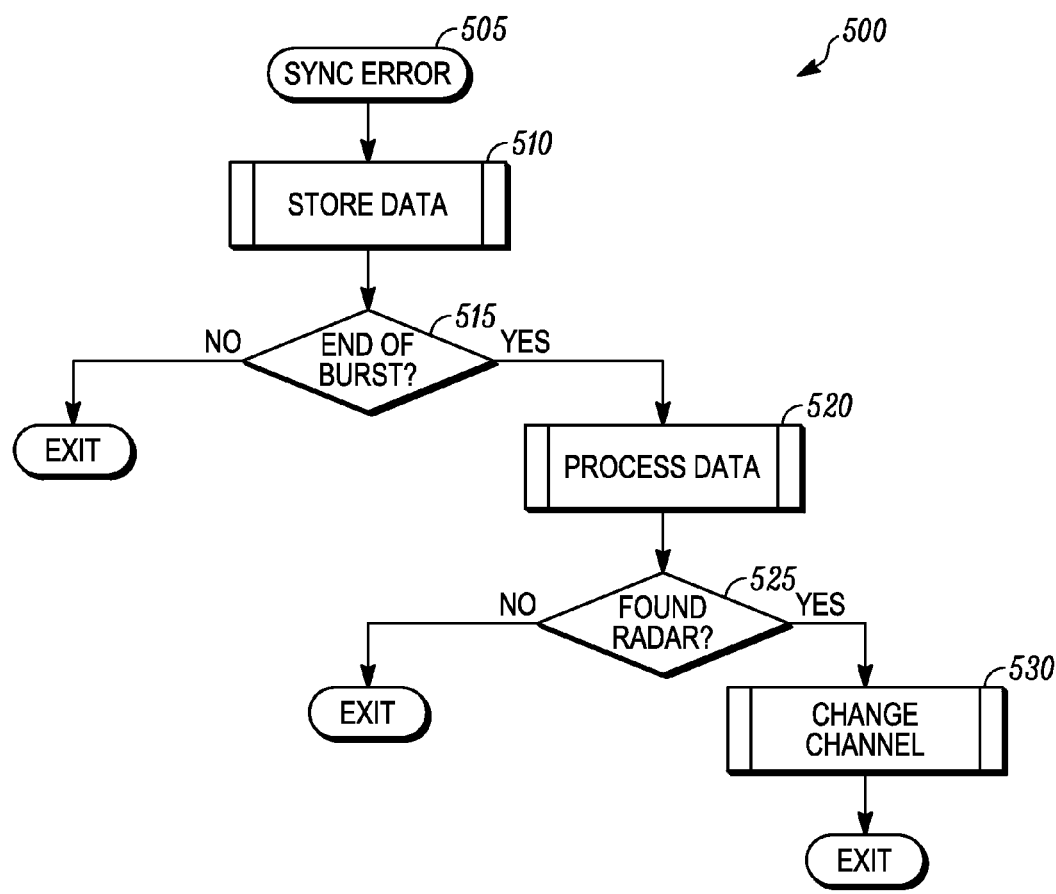
FIG. 5 is a flowchart of a method of real time detection of short pulses radar signals in accordance with some embodiments.

FIG. 5 is a general flowchart of a method of real time detection of short pulses radar signals 500 in accordance with some embodiments. As illustrated, the operation begins with Step 505 in which a synchronization error occurs. Next, in Step 510, a hardware interrupt is generated and data associated to the event is collected and stored. Next, in Step 515, it is determined whether an End of Burst (EOB) condition is identified. When an EOB is not identified, the operation of the method ends. When an EOB is identified, the operation continues to step 520 in which the set of collected data is processed. Next, in Step 525, it is determined whether or not the processing revealed the presence of a periodic signal (i.e. a periodic signal is considered as being from a radar source). When no radar signal is detected, the operation ends. When a radar signal is detected, the operation continues to Step 530 and the channel is changed as required by DFS rules. The operation then ends.

Further detail of the method of FIG. 5 will be described herein below.

Figure 6:
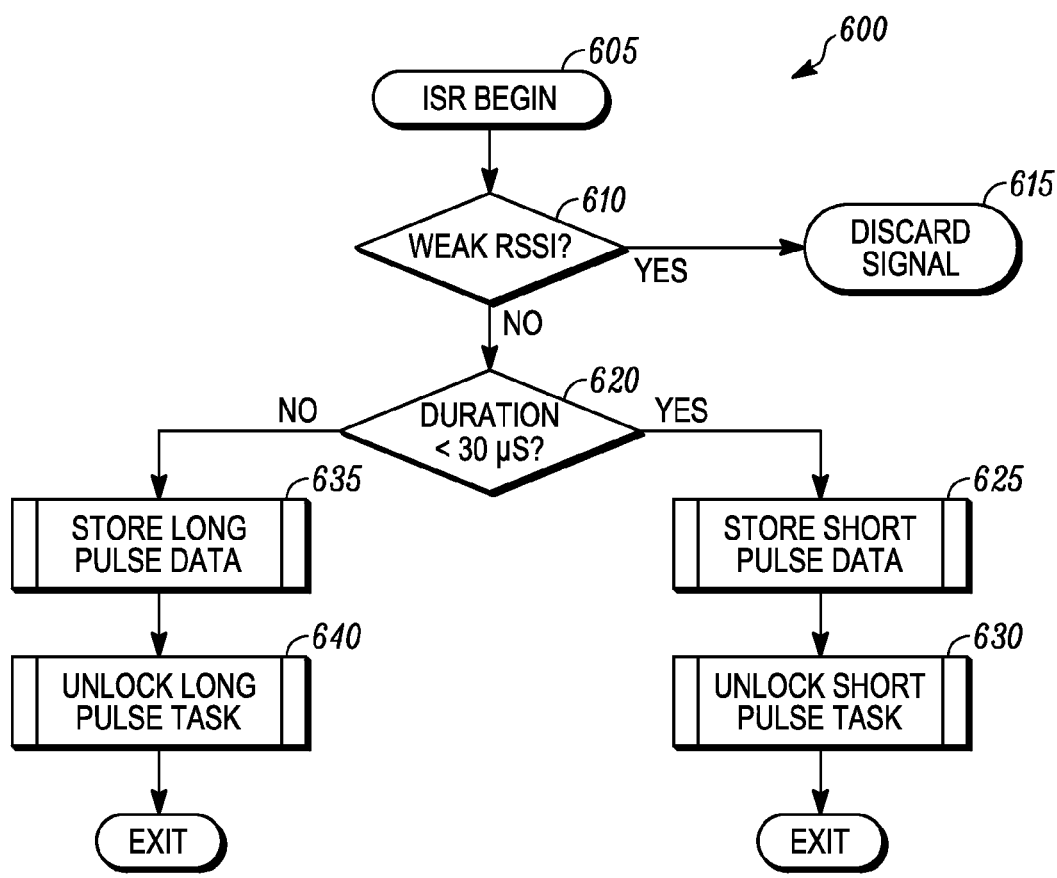
FIG. 6 is a flowchart of a method of processing a received pulse by an interrupt service routine in accordance with some embodiments.

FIG. 6 is a flowchart of a method of processing a received pulse by an interrupt service routine (ISR) 600 in accordance with some embodiments. This flowchart describes the operation previously marked as step 510 in the general flowchart from FIG. 5. As illustrated, the operation of the ISR begins in Step 605. Next, in Step 610, the strength of the received signal is checked. Specifically, in Step 610, it is determined whether the value of the RSSI (Received Signal Strength Indicator) indicates that the received signal is weaker than legal requirements of the country where the network is deployed. When the RSSI is weaker than $2\sigma$ (two sigma) under the legal requirements, in Step 615, the information about the received signal is discarded.

When the received signal is strong enough for further consideration, the operation continues to Step 620 in which the duration of the signal is checked. In accordance with some embodiments, data is collected over some interval in order to be analyzed for differentiating between radar pulses and other interfering signals. In Step 620, it is determined whether the duration of the signal is less than a pre-determined duration. For example, the pre-determined duration, in some embodiments, is 20 microseconds (μs). When the duration is less than the pre-determined duration, the operation continues to Step 625 in which the time of the pulse reception and the duration of the pulse are retained for analysis as short pulse radar signal. Next, in Step 630, a Short Pulse Task is unlocked for analyzing collected signals as will be described in further detail herein below with respect to FIG. 7.

When the duration of the pulse is more than or equal to the pre-determined duration, in Step 635, the information is stored as long pulse data. Next, in Step 640, a Long Pulse Task is unlocked and the information is analyzed with methods for identifying if they are long pulse radar signals.

It will be appreciated by those of ordinary skill in the art that the stored data (in Steps 625 and 635) for each received pulse should include a time of arrival (TOA) field (typically in microseconds), a RSSI field (typically in dB), a Duration field (typically in microseconds), a Count field and a Matched field (both Count and Match fields are set to zero when the signal information is stored). The Count and Match fields will be described in further detail herein after.

As illustrated in FIG. 6, after the proper task is unlocked (after Steps 630 and 640), the ISR exits.

It will be appreciated by those of ordinary skill in the art that the task processing the information is executed at low priority. It performs complete analysis of data only in some special conditions, for saving processor time for other tasks. When complete analysis is performed, only some of the stored entries of data are checked. For this reason, the algorithms provided herein can perform accurately even if data about some received pulses is missing.

Figure 7:
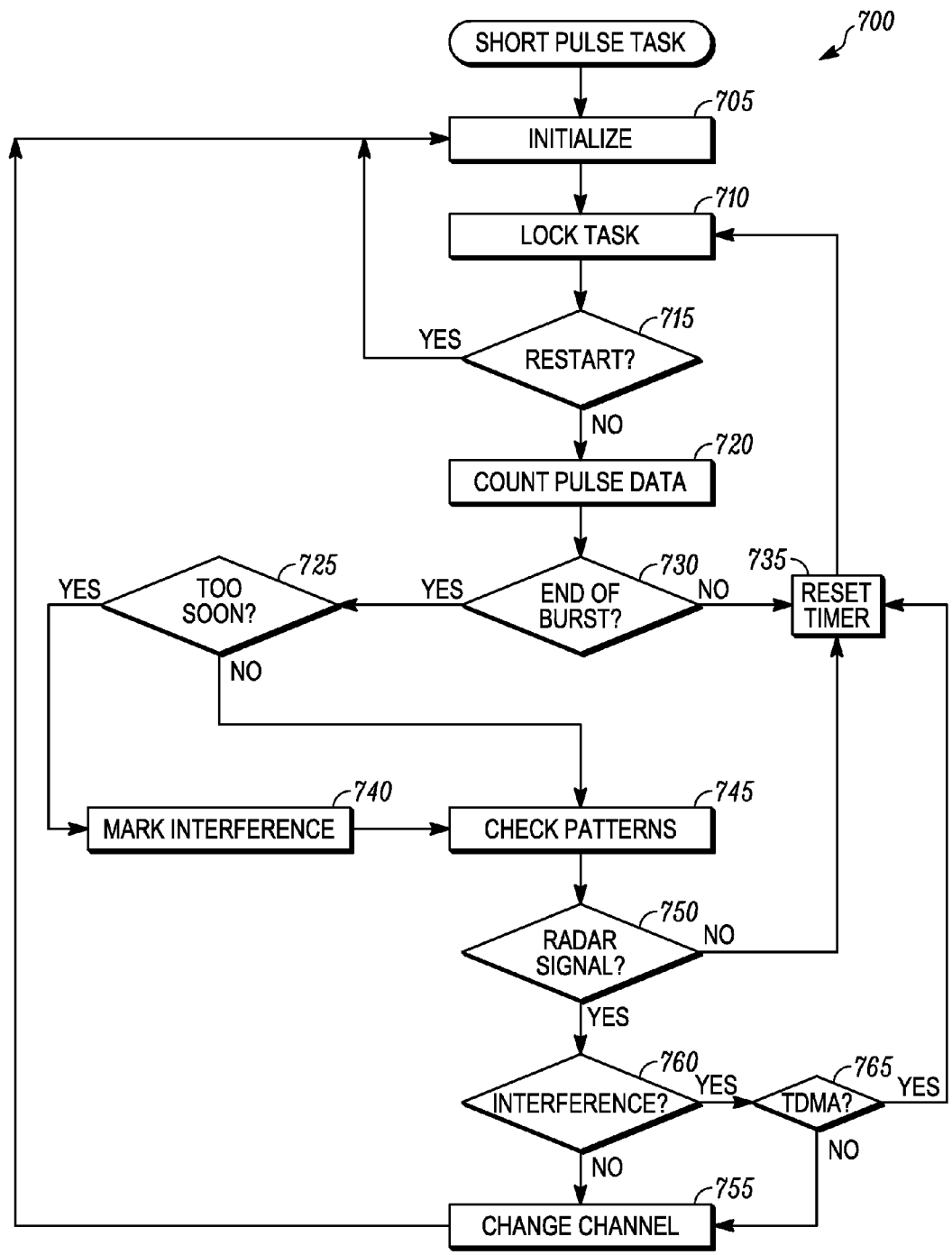
FIG. 7 is a flowchart of a method of processing a short pulse signal in accordance with some embodiments.

FIG. 7 is a flowchart of a method of processing a short pulse signal 700 in accordance with some embodiments. As illustrated, the operation begins with Step 705 in which the task initializes the hardware and the software variables. Next, in Step 710, the Short Pulse Task locks itself waiting for a short pulse signal to be received. After being unlocked by the ISR, in Step 715, the algorithm determines if the task should be restarted or not. The restart is requested by other tasks running on device after returning the receiver. When the task should be restarted, the operation cycles back to the initialization Step 705.

When a restart is not required, the operation continues to Step 720 in which the number of stored pulses is counted for identifying the condition for End of Burst (EOB). Next, in Step 730, it is determined whether or not the EOB condition has been met. When the EOB condition is met, the operation continues to Step 725 in which the task checks if enough time has passed since previous EOB.

When the EOB has happened too soon, the operation continues to Step 740 in which the task marks the event as "Interference." Next, the operation checks for possible radar patterns in step 745. In Step 750, it is determined whether or not any periodic patterns of pulses have been identified. When no periodic patterns have been identified, the operation continues to Step 735 in which the timer is reset. Next, the operation returns to Step 710, the task locks itself waiting for more data.

When a periodic signal has been identified in Step 750, the operation continues to Step 760 in which it is determined whether any interference has been signaled in the current channel. When the channel is free of interference, it is concluded that the periodic signal is from a radar installation and the operation proceeds to Step 755 in which a signal requesting a channel change is transmitted to proper tasks. The operation thereafter returns to the initialization Step 705 as the task restart is imminent. When interference has been reported in the operating frequency channel in Step 760, the operations proceeds to Step 765 in which it is determined whether the identified pattern matches any known TDMA pattern. When the identified pattern matches a known TDMA pattern, the operation proceeds to Step 735 in which the timer is reset. The operation then returns to Step 710 and the task processing short pulses locks itself waiting for more data.

When the pattern is not identified as a TDMA pattern, the operation proceeds to Step 755 in which a signal requesting a channel change is transmitted. The operation thereafter returns to the initialization Step 705.

The task processing short pulses locks itself in step 710 when it has no data to process or after completing the processing of available data. The task for processing short pulses is unlocked by the ISR (i.e. as in step 630 of FIG. 6) every time a new signal is received. It allows processing the collected data asynchronously from the reception of data presented in FIG. 6. When operating in a very clean frequency band, radar pulses are received in bursts of several milliseconds interleaved with long (i.e.: from 6 to 60 seconds) periods of silence. A special timer is used for unlocking the task after receiving the last pulse in a burst of radar pulses when the channel is free of interference. This timer is restarted in step 735. The timer unlocks the task few milliseconds after the last pulse in a burst of radar pulses has been received. In all other cases, the timer is reset (restarted) before it expire, at the arrival of successive pulses.

The algorithm for identifying the short pulse radar signature is very complex and requires a large amount of CPU time. For this reason the algorithm is executed only from time to time. For preventing the execution of this complex algorithm when the set of collected data is incomplete, a method for identifying the End of Burst (EOB) is implemented.

The EOB algorithm is executed at the reception of every short pulse and requires very little computation and identifies if a burst of pulses have ended or not, when the radar pulses are received interleaved with other interfering signals.

Figure 8:
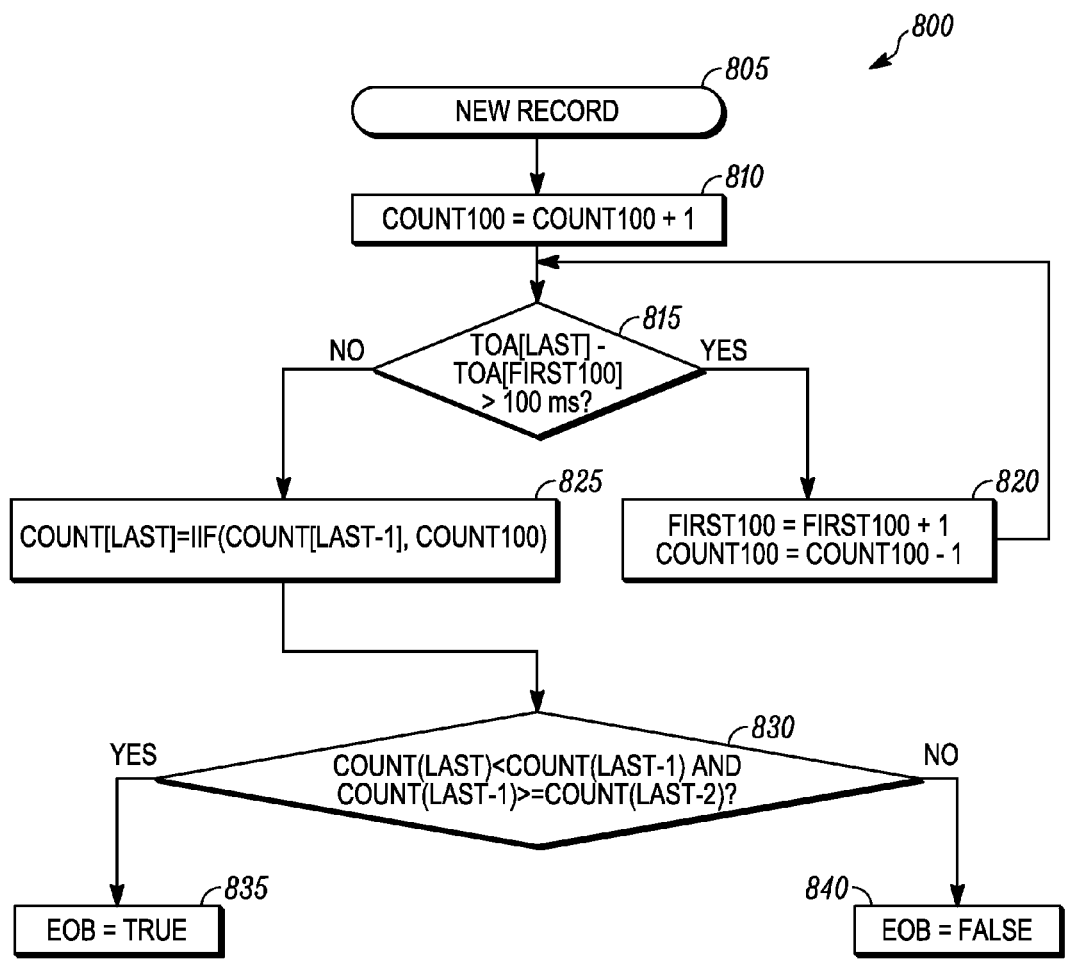
FIG. 8 is a flowchart of a method for identifying an end of a burst of radar pulses in accordance with some embodiments.

FIG. 8 is a flowchart of a method for identifying the end of a burst of radar pulses 800 in accordance with some embodiments.

The algorithm has as scope to identify, through not complicated computations, the moment when enough data has been stored and it can be used for identifying radar patterns. More precisely, the algorithm filters the number of samples collected in a sliding window of preset size (100 ms, for example) and identifies when the filtered value starts decreasing. Since the number of short radar pulses is much higher than the number of other random interfering signals, at the end of a burst of radar pulses the count of pulses in a sliding window drops very fast.

Similar result can be achieved by filtering the interval between successive receptions of pulses or interfering signals. The size of the filtered interval increases after the burst of short pulses has ended, but signals from other interfering sources continue to be received.

The algorithm for detecting EOB handles the following variables:

"Last": The index in the storage where the last record is stored. The value is set and updated by ISR.
"First100": The index in storage where is located the first record from the set of pulses received in last 100 ms. The value of First100 is updated by EOB.
"Count100": The unfiltered number of records stored in last 100 ms. The value is updated by EOB.
"Count[Last]": The filtered count of signals received in last 100 ms. The value is set by EOB.

As illustrated in FIG. 8, when, in Step 805, a new record is added to storage, the counter of records received in last 100 ms is increased by one in Step 810.

Next, in Step 815, it is determined whether the first record in the subset is older than 100 ms compared with the time when the last pulse has been received. When the time of arrival of the last record is greater than 100 ms after the time of arrival of the first record, the operation continues to Step

820, in which the index "First100" is advanced by one and the counter of records "Count100" is decreased by one. The operation then cycles back to Step 815.

Alternatively, when all records located between index "First100" and index "Last" were received in the last 100 ms, the operation continues to Step 825 and the algorithm computes the filtered (an Infinite Input Filter is very adequate to this purpose) value of the number of records and stores it in field "Count" at position "Last".

Next, in Step 830, it is determined whether there is a drop in last three filtered values of the COUNT. For this purpose the "Last" value of "Count" is checked to determine if it is smaller than the value before the last (position "Last-1"); and if the value of "Count" before the last is larger or equal with the value of "Count" at position "Last-2". When the "Last" value of "Count" is smaller than the value before the last (position "Last-1") and the value of "Count" before the last is larger or equal with the value of "Count" at position "Last-2", the algorithm returns TRUE (EOB has been identified) in Step 835. When the "Last" value of "Count" is not smaller than the value before the last (position "Last-1") or the value of "Count" before the last is smaller than the value of "Count" at position "Last-2", the algorithm returns FALSE in Step 840.

In some conditions, the duration of the burst is very short. For example, a burst can have 18 pulses transmitted at 700 pulses per second, or 25.7 ms length of the burst. For correct identification of the end of the burst, the size of the sliding window of the EOB filter can be changed from 100 to 50 ms.

Figure 9:
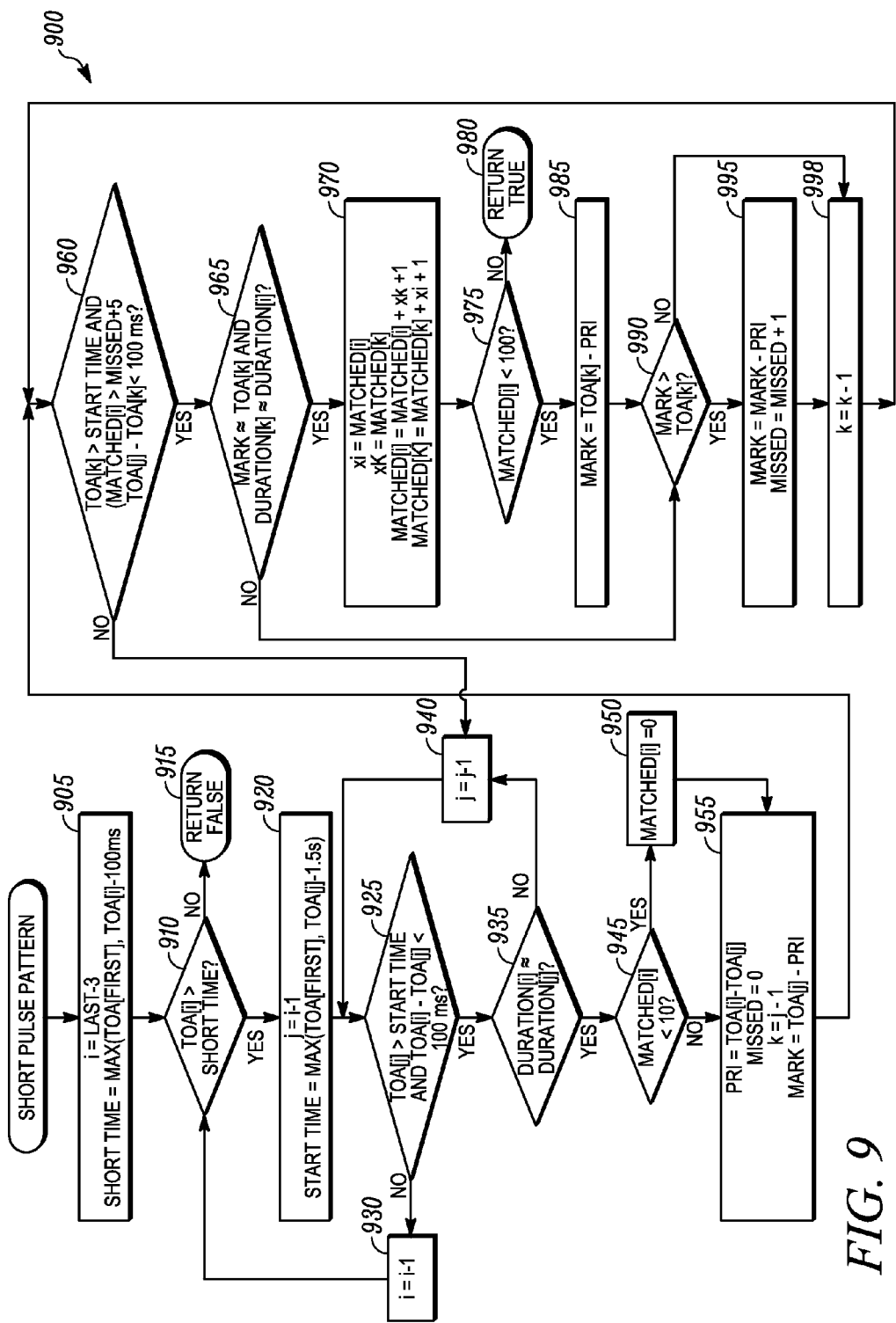
FIG. 9 is a flowchart of a method for identifying a string of radar pulses in accordance with some embodiments.

FIG. 9 is a flowchart of a method for identifying a string of radar pulses in accordance with some embodiments.

The algorithm is started when End of Burst has been identified. (For example, Step 835 of FIG. 8.) The method of FIG. 9 tries to identify a string of radar pulses (subset in the set of received pulses), that have almost equal Pulse Repetition Interval (PRI) and almost the same duration.

The algorithm uses as indexes the following variables:
"Last"—the index of the last pulse in the storage (set by ISR),
"First"—the index of the first pulse in the store (the oldest sample, updated by ISR for pre-venting overrun),
"i"—the index of the last pulse in the radar string of pulses (local),
"j"—the index of the pulse before the last in the radar string of pulses (local) and
"k"—the index of currently checked data (local).
Other local variables are:
"StartTime"—the time of the "First" pulse,
"ShortTime"—the interval where the algorithm searches for the last two radar pulses of the last burst (not more than 100 ms),
"PRI"—supposed Pulse Repetition Interval,
"Missed"—number of not received pulses (missing) in currently analyzed string,
"Mark"—the expected time of the next pulse, if it is should be a radar pulse.
Global variables:
"TOA"—Array of Time of Arrival for received pulses (set by ISR)
"Duration"—Array of duration for received pulses (set by ISR)
"Matched"—Array with an indicator of probability of a received signal to be a radar pulse (initially set by ISR to zero and updated by the algorithm for identifying the Short Pulse Pat-tern).

The algorithm searches the set of collected data for identifying a subset that could be classified as a string of radar pulses. In order for a subset of received signals to be classified as radar short pulses, it should have the following properties:
The difference between the receiving times of successive pulses should be almost constant. It is known as the Pulse Repetition Interval (PRI),
The duration of pulses selected in the set should be almost the same,
A reasonable large number of pulses should have been received in the last burst.

It will be appreciated by those of ordinary skill in the art that numerical values utilized can change from country to country.

The search for the subset is performed backwards, from the current moment to the past. Searching from past to future is also possible, but it requires more elaborate computation.

The algorithm selects pairs of received signals with similar length and checks the rest of the set against these two samples. Each correct match is recorded.

Specifically referring to FIG. 9, the operation begins with Step 905 in which the variable "i" is set to "Last-3". Because an EOB has been identified when "Last" data has been stored, it is very probable that the last pulse of the burst (end of burst) was stored at "Last-2" or "Last-3" position. The limits for the search of the last two radar pulses are the "ShortTime" and the TOA of pulse "Last-3" (corresponding to almost 100 ms interval).

Next, in Step 910, it is determined whether the search for the last two radar pulses has passed the "ShortTime" moment. When no radar signal can be identified, the operation proceeds to Step 915 and returns FALSE. It would be the case when the pulse was generated by another source other than a radar installation.

When the TOA[i] is after the "ShortTime", the operation continues to Step 920 and the pulse stored at "j=i−1" is selected as another possible radar pulse.

Next, in Step 925, it is determined whether the TOA of pulse "j" is either earlier than TOA of pulse "i" with more than 100 ms or outside the searching interval. When the TOA of pulse "j" is either earlier than TOA of pulse "i" with more than 100 ms or outside the searching interval, in Step 930, the value of "i" is decreased and the computation returns to step 910 for considering another pulse as an end of the set of radar pulses.

When the timing of the "j" pulse is correct, the operation continues to step 935 in which its duration is compared with the Duration of pulse "i". In order for these two pulses to be generated by the same radar installation, their durations should be almost equal, with some small errors caused by the equipment. (The sign should be understood as "almost equal" where the differences are within equipment measuring precision).

When the durations of both signals are different, the operation proceeds to Step 940 in which the variable "j" is decreased by one and the algorithm continues with Step 925, considering another pulse as member of the radar set.

When the duration of both signals is the same, the operation proceeds to Step 945 in which it determines whether a predefined threshold comprising a small number (ten in this case) of matches have been identified for pulse "i". When less than the threshold of matches is identified, the operation continues to Step 950 in which these matches are considered insignificant and are removed.

Next, and when greater than the threshold of matches is identified, in Step 955, the initial values for searching for radar patterns are set according the with characteristics of pulses "i" and "j". In the selected set, pulse "i" will be the last radar pulse while pulse "j" will be the pulse before the last.

PRI of the set of radar pulses is considered as the time interval between the reception of pulse "j" and pulse "i." The TOA of the previous pulse (Mark) is computed from TOA of pulse "j" by subtracting estimated PRI. The index of the first pulse to be checked is set to "k=j−1".

Next, in Step 960 it is determined whether the TOA of pulse "k" is before the "StartTime" or TOA of pulse "k" is more than 100 ms before TOA of pulse "j" and the difference between the number of missing pulses and the number of matched pulses is larger than 5 (too many misses). When, the TOA of pulse "k" is before the "StartTime" or TOA of pulse "k" is more than 100 ms before TOA of pulse "j" and the difference between the number of missing pulses and the number of matched pulses is larger than 5 (too many misses), the search for the currently selected pattern is abandoned, and the operation returns to Step 940 in which the value of variable "j" is decreased by one and the algorithm continues with Step 925 searching for another pattern.

Otherwise, the operation continues to Step 965 in which it is determined whether the TOA of pulse "k" is almost the same as the expected Mark and the duration of pulse "k" is almost the same as the duration of pulse "i".

When the TOA of pulse "k" is almost the same as the expected Mark and the duration of pulse "k" is almost the same as the duration of pulse "i", the pulse "k" is probably in the same string of radar pulses with pulses "i" and "j". For this reason, at Step 970, the counter of matches of both pulses "i" and "k" is increased by one. Also, the counter of pulse "i" is increased with the counter of pulse "k" while the counter of pulse "k" is increased with the counter of pulse "i".

Next, in Step 975, it is determined whether the counter of matches of pulse "i" is larger than 100 (or another preset limit). When the counter of matches of pulse "i" is larger than 100 (or another preset limit), at Step 980, the search is stopped as a large enough number of pulses have been identified as having periodic TOA and the same duration. In other words, a radar pattern has been identified. The return=TRUE.

When not enough pulses have been identified yet, the operation continues to Step 985 where the Mark variable is changed to the TOA of the next expected pulse, by subtracting the PRI value from the last correctly identified TOA.

Next, and when Step 965 yields a negative determination, in Step 990, it is determined whether the Mark is larger than the TOA of pulse "k". When the Mark is larger than the TOA of pulse "k", in Step 995, the Mark is decreased by PRI and the counter of missed pulses is increased by one.

Next, and when the Mark is not larger than the TOA[k], the operation continues to Step 998 where the value of "k" is decreased by one and the previous pulse is checked if it can be added to the already identified string of radar pulses. The computation returns to Step 960.

The method of FIG. 9 has three embedded loops on "i", "j", and "k", which suggests an execution time of $O(n^3)$. The execution of one search is longer when no radar signals are present and depends on the number of sources causing non-radar signals (adjacent channel interferences). The value of $O(n^3)$ is dramatically reduced by limiting the extent of unsuccessful search to the last 100 ms of received pulses and performing the check only when an End of Burst is identified. It is expected that the execution time on a 200 MHz processor is less than 35 ms when four sources of non-radar signals are present (two in each adjacent channel), and between 2 and 10 ms when to the four sources of non-radar pulses is added one source of radar signals.

It will be appreciated by those of ordinary skill in the art that the operation described herein before "learns" the pattern of signals. It allows fast execution, but makes difficult the identification of bursts with small number of pulses. The tests showed that the algorithm makes correct detections when at least 6 radar pulses are available for a single-tone radar. A test with a tri-tone radar signal with 36 pulses per burst (12 of each tone) showed that the PRI is clearly identified even if only 12 pulses are received (4 pulses of each tone).

In conditions with heavy interference, when a large number of radar signals are obstructed by interfering signals, radar signals can be properly identified from data collected over two or more consecutive bursts. Usually, short bursts are caused by very fast movement of radar antenna, which implies also that bursts should be expected frequently. The regulations require that a U-NII device providing full DFS services should listen for one minute before it starts transmitting. It is enough time for collecting a very large amount of pulses, even if the number of correctly received pulses per burst is small.

The searching algorithm operates within time intervals for preventing unnecessary search. It can be very easily converted to "interval of samples" which is more appropriate when the number of pulses is small. For example, instead of limiting the search for the first two pulses of the radar string to those samples collected within last 100 ms, it can be limited to the last collected 5 samples. As well, the search for pulses in the same string can be executed within the last 100 samples, instead of searching samples collected during the last second. It should make the execution time more predictable and make possible the optimization of CPU use.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for detection of radar signals by a wireless communication device operating within a wireless communication network, the method comprising operating the wireless communication device to:
   identify an End-Of-Burst (EOB) condition associated with one or more received interfering signals;
   determine whether a periodic signal comprising a periodic pattern of pulses is included within the received interfering signals;
   determine whether an interference has been signaled in a current channel and whether the periodic interfering signal has a pattern of a TDMA transmission; and
   when no interference has been signaled in the current channel or if interference has been identified and the periodic signal does not have a TDMA pattern, identify the periodic signal as a radar signal.

2. The method of claim 1, further comprising operating the wireless communication device to:
   collect information about one or more received interfering signals, wherein the EOB condition is identified from the collected information.

3. The method of claim 2, wherein the operation of determining a periodic signal comprising a periodic pattern of pulses is included within the received interfering signals comprises operating the wireless communication device to:
   compare a time interval between pulses in the information of each received interfering signal with an associated time between pulses in one or more other collected information, and
   determine a signal is a periodic signal when the time interval or a multiple of the time interval occurs between other pulses in the collected information.

4. The method of claim 1, further comprising operating the wireless communication device to:
   identify a signal as a radar signal when at least one pulse has been identified as a radar pulse for a number of times larger than a predefined limit.

5. The method of claim 1, wherein the operation of identifying an End of Burst (EOB) comprises operating the wireless communication device to:
   count a number of stored pulses within a time interval of a similar size to a longest possible radar burst,
   filter the number of pulses received within a sliding window with a size of the time interval,
   establish that the burst has ended when the last filtered value is smaller than the value before the last and the value before the last is equal or larger than the previous value.

6. The method of claim 1, further comprising operating the wireless communication device to:
   determine whether a predetermined amount of time has passed since a previous EOB; and
   when the predetermined amount of time has not passed since the previous EOB, mark the signal as an interference signal.

7. The method of claim 1, wherein the operation of the wireless communication device comprises operating an interrupt service route within the wireless communication device.

8. The method of claim 1, further comprising repeating the operating of the wireless communication device to identify an End-Of-Burst (EOB) condition, determine whether a periodic signal comprising a periodic pattern of pulses is included, determine whether an interference has been signaled in a current channel; and when no interference has been signaled in the current channel, identify the periodic signal as a radar signal for each received interference signal.

9. The method of claim 1, further comprising operating the wireless communication device to:
   set a timer for unlocking the operation after receiving a last pulse in a burst of radar pulses when the channel is free of interference.

10. The method of claim 9 further comprising operating the wireless communication device to:
    select a time interval larger than a largest time interval between any two known radar PRI; and
    set the timer to the time interval.

11. The method of claim 10, further comprising operating the wireless communication device to:
    reset the timer after receiving a pulse.

* * * * *

UNITED STATES PATENT AND TRADEMARK OFFICE
CERTIFICATE OF CORRECTION

| | | |
|---|---|---|
| PATENT NO. | : 8,219,034 B2 | Page 1 of 1 |
| APPLICATION NO. | : 12/554408 | |
| DATED | : July 10, 2012 | |
| INVENTOR(S) | : Belcea | |

It is certified that error appears in the above-identified patent and that said Letters Patent is hereby corrected as shown below:

In Column 4, Line 12, delete "a is" and insert -- • is --, therefor.

In Column 4, Line 14, delete "a is" and insert -- • is --, therefor.

In Column 5, Line 33, delete "returning" and insert -- retuning --, therefor.

Signed and Sealed this
Eighth Day of January, 2013

David J. Kappos
*Director of the United States Patent and Trademark Office*